United States Patent
Kiik et al.

(10) Patent No.: US 6,936,329 B2
(45) Date of Patent: *Aug. 30, 2005

(54) FASTENER-FREE COMPOSITE ROOFING PRODUCT

(75) Inventors: Matti Kiik, Dallas, TX (US); Michael Bryson, Blue Springs, MO (US); Micheal Allen McLintock, Grapevine, TX (US); Kevin L. Beattie, Plano, TX (US)

(73) Assignee: ElkCorp., Dallas, TX (US)

( * ) Notice: Subject to any disclaimer, the term of this patent is extended or adjusted under 35 U.S.C. 154(b) by 106 days.

This patent is subject to a terminal disclaimer.

(21) Appl. No.: 10/620,077

(22) Filed: Jul. 15, 2003

(65) Prior Publication Data

US 2004/0055240 A1 Mar. 25, 2004

Related U.S. Application Data

(63) Continuation-in-part of application No. 10/211,663, filed on Aug. 2, 2002, now Pat. No. 6,708,456, and a continuation-in-part of application No. 10/212,012, filed on Aug. 2, 2002, and a continuation-in-part of application No. 09/897,308, filed on Jul. 2, 2001, now Pat. No. 6,673,432, and a continuation-in-part of application No. 09/663,255, filed on Sep. 15, 2000, now Pat. No. 6,586,353.

(60) Provisional application No. 60/331,808, filed on Nov. 20, 2001, provisional application No. 60/310,031, filed on Aug. 3, 2001, and provisional application No. 60/168,057, filed on Nov. 30, 1999.

(51) Int. Cl.[7] .............................. E04B 1/00; E04C 1/00; B32B 27/04

(52) U.S. Cl. .............................. 428/141; 52/98; 52/100; 52/314; 52/315; 52/518; 52/554; 52/555; 52/557; 428/357; 442/64; 442/65; 442/68; 442/136; 442/172; 442/320

(58) Field of Search .............................. 442/64, 65, 68, 442/136, 172, 320; 428/141, 357; 52/98, 314, 555, 557, 100, 315, 518, 554

(56) References Cited

U.S. PATENT DOCUMENTS

| | | | |
|---|---|---|---|
| 3,921,358 A | 11/1975 | Bettoli | 52/314 |
| 4,567,079 A * | 1/1986 | Canfield et al. | 428/131 |
| 4,717,614 A | 1/1988 | Bondoc et al. | 428/143 |
| D309,027 S | 7/1990 | Noone et al. | D25/139 |
| 5,232,530 A | 8/1993 | Malmquist et al. | 156/78 |
| 5,369,929 A | 12/1994 | Weaver et al. | 52/557 |
| D369,421 S | 4/1996 | Kiik et al. | D25/139 |
| 5,611,186 A | 3/1997 | Weaver | 52/557 |
| 5,666,776 A | 9/1997 | Weaver et al. | 52/557 |
| 5,965,257 A | 10/1999 | Ahluwalia | 428/357 |
| 6,289,648 B1 | 9/2001 | Freshwater et al. | 52/557 |
| 6,341,462 B2 | 1/2002 | Kiik et al. | 52/518 |
| 6,500,560 B1 | 12/2002 | Kiik et al. | 428/489 |
| 6,586,353 B1 | 7/2003 | Kiik et al. | 442/320 |
| 6,673,432 B2 | 1/2004 | Kiik et al. | 428/301.1 |
| 6,708,456 B2 | 3/2004 | Kiik et al. | 52/98 |
| 2003/0040241 A1 | 2/2003 | Kiik et al. | 442/242 |

* cited by examiner

Primary Examiner—Norca L. Torres
(74) Attorney, Agent, or Firm—Fitzpatrick, Cella, Harper & Scinto

(57) ABSTRACT

A fastener-free composite roofing product comprising a roofing material and an interply material attached to the roofing material, wherein the interply material includes an adhesive coating on one side. The interply material is attached adjacent to an edge of the roofing material to permit a major portion of the interply material to be folded away from the roofing material for application to a roof. The adhesive is effective to secure the roofing product to the roof without the use of nails or other fasteners. The roofing material may be a roofing shingle or roll roofing, and the interply material is comprised of a water resistant material.

29 Claims, 5 Drawing Sheets

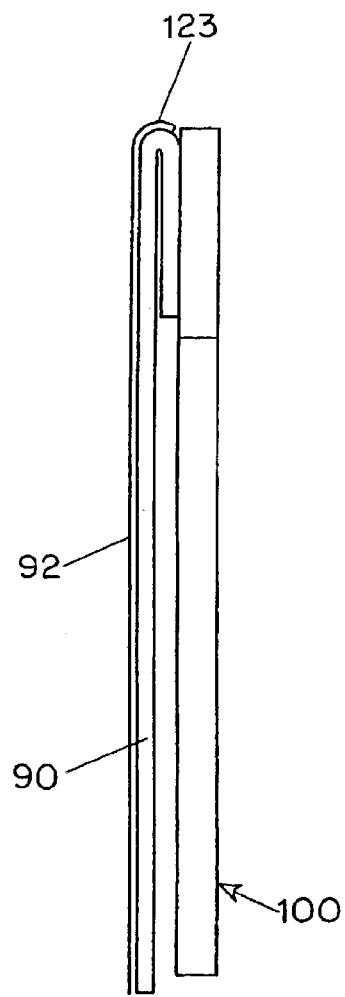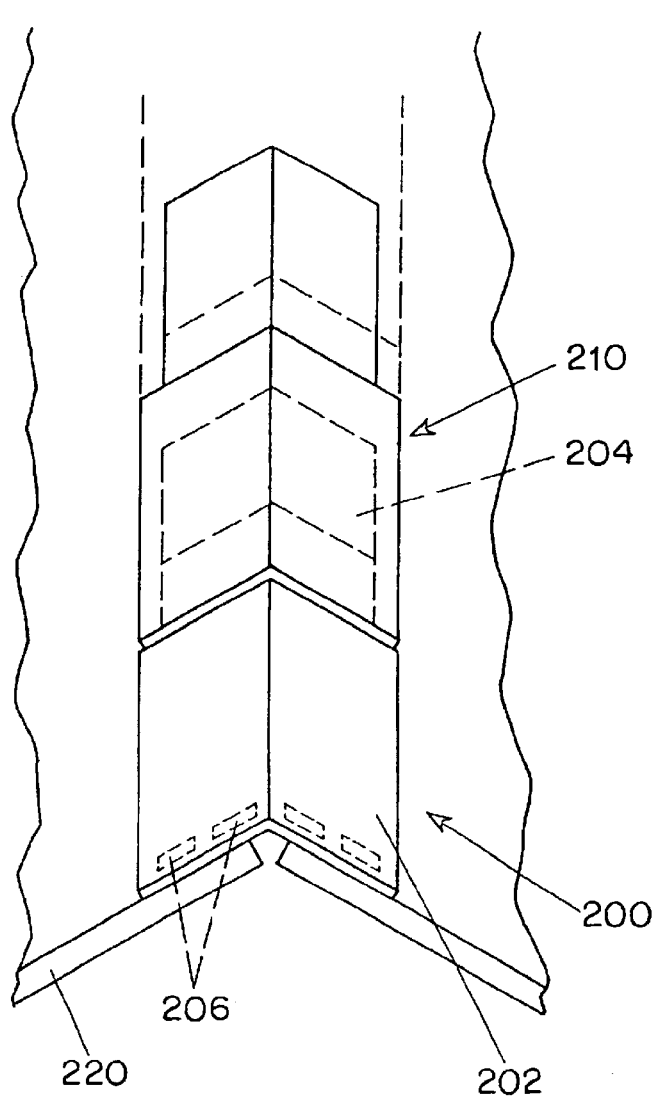
FIG. 6
FIG. 7

FASTENER-FREE COMPOSITE ROOFING PRODUCT

CROSS REFERENCE TO RELATED APPLICATIONS

This application is a continuation-in-part of U.S. patent application Ser. No. 10/211,663 filed on Aug. 2, 2002, now U.S. Pat. No. 6,708,456 which claims priority under 35 U.S.C. §119(e) to Provisional Patent Application No. 60/331,808 filed on Nov. 20, 2001, and which is a continuation-in-part of U.S. patent application Ser. No. 09/663,255 filed on Sep. 15, 2000, now U.S. Pat. No. 6,586,353 which application claims priority under 35 U.S.C. §119(e) to Provisional Patent Application No. 60/168,057 filed on Nov. 30, 1999; a continuation-in-part of U.S. patent application Ser. No. 09/897,308, filed on Jul. 2, 2001 now U.S. Pat. No. 6,673,432; and a continuation-in-part of U.S. patent application Ser. No. 10/212,012, filed on Aug. 2, 2002, which claims priority under 35 U.S.C. §119(e) to Provisional Patent Application No. 60/310,031, filed Aug. 3, 2001.

TECHNICAL FIELD OF THE INVENTION

The present invention relates generally to a fastener-free composite roofing product comprised of a roofing material and an interply material attached thereto. The interply material includes an interply adhesive on one side which allows for the composite roofing product to be installed on a roof deck without the use of any mechanical attachment to the roof. The roofing material may be any type of roofing material, including roofing shingles and roll roofing. The interply material is water resistant.

BACKGROUND

Roofing products are often divided into three broad groups: shingles, roll roofing and underlayment. Shingles and roll roofing typically function as outer roof coverings designed to withstand exposure to weather and the elements. In a typical roof installation, the underlayment is first laid on top of the roof deck, and then the outer roofing covering (e.g., shingles or roll roofing) is attached on top of the underlayment. Asphalt shingles and roll roofing generally contain the same basic components which provide protection and long term wear associated with asphalt roofing products. Asphalt shingles (sometimes also referred to as composite shingles) are one of the most commonly used roofing materials. Asphalt shingles may include an organic felt or fiberglass mat base on which an asphalt coating is applied. The organic felt or fiberglass mat base gives the asphalt shingle the strength to withstand manufacturing, handling, installation and servicing activities, and the asphalt coating provides resistance to weathering and stability under temperature extremes. An outer layer of mineral granules is also commonly applied to the asphalt coating to form a weather surface which shields the asphalt coating from the sun's rays, adds color to the final product, and provides additional fire resistance.

Asphalt shingles are typically manufactured as single layer shingles, strip or three tab shingles, multiple layer shingles, laminated shingles, interlocking shingles, and large individual shingles in a variety of weights and colors.

Various asphalt shingles have been developed to provide an appearance of thickness and texture comparable to wood shingles. Examples of such asphalt shingles are shown in U.S. Pat. No. 5,232,530 entitled "Method of Making a Thick Shingle"; U.S. Pat. No. 3,921,358 entitled "Composite Shingle"; U.S. Pat. No. 4,717,614 entitled "Asphalt Shingle"; and U.S. Pat. Des. No. D309,027 entitled "Tab Portion of a Shingle." Some laminated asphalt shingles simulate the appearance of slate roofing shingles. See U.S. Pat. No. Des. 369,421. Each of the patents mentioned in this paragraph is incorporated by reference herein in its entirety.

In addition to these patents, significant improvements in the art of roofing shingles have been disclosed and patented in U.S. Pat. Nos. 5,369,929; 5,611,186; and 5,666,776; each entitled "Laminated Roofing Shingle", issued to Weaver et al. and assigned to the Elk Corporation of Dallas. These patents disclose laminated roofing shingles developed to create the illusion of thickness or depth on a relatively flat surface by including a backer strip having striations of color beneath and between tabs wherein the color is uniform within the tab. Each of these three patents is also incorporated by reference herein in its entirety.

Further improvements include the use of larger shingles having a buttlap section of greater than about 7 inches to provide a more pleasing appearance and a greater visual impact by providing enhanced dimensionality, as disclosed in pending U.S. patent application Ser. No. 09/401,392 entitled "Laminated Roofing Shingle" and filed on Sep. 22, 1999, which is incorporated herein by reference in its entirety. Shingles typically have a buttlap section, a part of which is exposed to the environment, and a headlap section, which is covered by the buttlap section of the shingle in the next row above. The headlap section is typically wide in order to (i) provide waterproofing, (ii) insure that a majority of the roof is covered by at least one layer of buttlap section and at least one layer of headlap section, and (iii) aid in the production and handling of the shingle.

All of the aforementioned roofing products require the use of an underlayment which is applied to cover the deck of a roof before the application of roofing shingles or other roofing material. Its primary purpose is to shield the roof deck from moisture, both during assembly and after roof installation. Underlayment also helps reduce "picture framing" in which the outline of deck panels caused by irregularities in the deck surface may be visible through the roofing material applied to the roof deck. Further, it is desired that roofing underlayment be a key component of a fire rated roof assembly. The underlayment structure should assist in preventing flaming of the underside of the deck when exposed to fire on top of the roof covering assembly. Thus, the benefits of the underlayment in the roof assembly are to provide additional water resistance and fire resistance, and to provide uniformity of the appearance of the roof surface.

Roofing underlayment typically comprises a dry cellulosic felt that can be impregnated or saturated with an organic material such as asphalt. When used as an underlayment, felt typically does not provide a completely flat surface, but has wrinkles, undulations, and distortions. It may also distort under high moisture conditions. Saturated organic felt underlayment has poor fire resistance and when burned, disintegrates.

Traditional underlayments are vulnerable to damage before the protective roofing material is laid down. For example, traditional underlayments can be damaged by workers walking on the underlayment or by items, such as tools, dropped on the underlayment. Ripped or torn underlayment will not serve as an effective waterproofing barrier and must be patched before the roofing material (e.g. roofing shingles or roll roofing) can be laid down.

U.S. Pat. No. 6,500,560, which is assigned to the assignee of the present invention and is incorporated in its entirety herein by reference, provides a roofing underlayment which is an asphalt coated structural article comprising a substrate having an ionic charge coated on one side with a layer of asphaltic material and coated on the other side with a coating having essentially the same ionic charge as the substrate. It may be used as a roofing underlayment for concrete tiles or to waterproof the basement walls of a building structure.

U.S. patent application Ser. No. 09/663,255, filed on Sep. 15, 2000, which is assigned to the assignee of the present invention and is incorporated herein by reference in its entirety, relates to a roofing underlayment system useful in roof assemblies comprising at least two layers of a coated structural article which comprises a substrate having an ionic charge coated with a coating having essentially the same ionic charge, or at least one layer of such coated structural article in combination with at least one layer of felt material.

Roofing underlayment and roofing materials are typically installed on a roof deck with fasteners such as nails. However, there are roofing underlayments available which have an adhesive on one side and can be installed on a roof by adhering the underlayment to the roof. Examples of such underlayments include the underlayment described by U.S. Pat. No. 6,500,560. In addition, self-adhesive peel and stick membranes which can be used as underlayments are available from Malarkey (Pleasanton, Calif.; Right Start™ and Arctic Seal™ Peel & Stick), Polyglass USA (Hazleton, Pa.; Polystick™ IR-X, Polystick™ P, Polystick™ TU and Polystick™ MU) WR Grace (Columbia, Md.; Ice & Water Shield™), Georgia-Pacific (Atlanta, Ga.; Tough-Guard™), Tamko (Joplin, Md.; TW Metal & Tile Underlayment, TW-60, TW Flash-n-Wrap™, TW Moisture Wrap™, TW Moisture Guard, and Bridgeguard™), GAF (Wayne, N.J.; WeatherWatch®, StormGuard®, MetalMate™), and Certainteed (Valley Forge, Pa.; Black Diamond™ base sheet).

While the use of a separate underlayment installed prior to the installation of roofing materials has been an acceptable means for achieving the desired effects (i.e. additional water resistance and fire resistance, and to enhance uniformity of the appearance of the roof surface), a roofing composite that provides the function of a roofing underlayment and the roofing material in a single product, and that enables easier installation would be desirable.

U.S. patent application Ser. No. 10/211,663, incorporated in its entirety herein by reference, and which is assigned to the assignee of the present invention, discloses a composite roofing product which comprises a roofing material and an interply material attached to the roofing material. The interply material is an underlayment-type material which is water resistant and replaces the headlap portion of the shingle. However, the roofing product of U.S. patent application Ser. No. 10/211,663 requires the use of nails or other fasteners to secure it to the roof deck.

SUMMARY OF THE INVENTION

In accordance with the present invention, a composite roofing product comprises a roofing material, such as multiple layer shingles, laminated shingles, single layer shingles or three tab shingles, or roll roofing, and an interply material attached along an edge of the roofing material. The interply material includes a fold line to permit a major portion of the interply material to be folded away from the roofing material for application on a roof. The fold line is achieved by conventional techniques, nonlimiting examples of which include scoring and perforation. The interply material is coated on one side with an adhesive which, when pressed against a roof deck, secures the interply material and attached roofing material firmly to the roof deck without the need for nails or other fasteners. When applied in successive courses to cover a roof deck, the roofing material of the composite product overlays the interply material of the roofing product in the preceding course to cover the entire roof deck with a layer of interply material against the deck and a layer of roofing material over the interply material.

As packaged, the product has its interply material attached to the roofing material along an edge thereof, e.g. along the headlap section of a shingle, with its uncoated surface against the outer or weather surface of the roofing material. The adhesive-coated surface of the interply material is covered with a release film. To install the composite roofing product, the release film is removed from the interply material, the interply material is folded away from the roofing material along a fold line parallel to the edge along which it is attached to the roofing material, and the exposed adhesive-coated side of the interply material is pressed on the roof deck to secure the roofing product to the roof deck. The adhesive coating of the interply material ("interply adhesive") firmly secures the product to the roof deck without nails or other fasteners and provides a rugged, waterproof layer covering the roof deck, without the need for a separate underlayment.

The arrangement of the invention enables a roofing product to present a wider exposed surface than conventional products without the necessity for retooling existing manufacturing equipment.

The fastener-free composite roofing product of the present invention may include roofing materials such as, but not limited to, laminated asphalt shingles, three tab asphalt shingles, hip and ridge shingles, multi-layered shingles, or roll roofing.

The interply material comprises a water resistant material and preferably a water and fire resistant material, coated on one side with an adhesive which enables the fastener-free installation of the interply material on a roof deck. The fastener-free composite roofing product of the present invention may be applied to any roof deck, including a roof deck which already has a roofing material installed on it. The previously installed roofing material may be removed prior to the installation of the fastener-free composite roofing product of the present invention or, where permitted by local building codes, may remain on the roof deck with the nail-less composite roofing product being installed over the previously installed roofing material.

The interply material, to which the adhesive may be applied, may be a coated structural article such as those disclosed in U.S. Pat. Nos. 5,965,257 and 6,500,560, both of which are assigned to the assignee of the present invention, and which are incorporated herein by reference in their entirety. Such an interply material may be comprised of a substrate having an ionic charge coated with a coating having essentially the same ionic charge, and has an interply adhesive on one side. The coating consists essentially of a filler material and a binder material. The binder material bonds the filler material together and to the substrate. The coating does not bleed through the substrate. The interply material may be from 10% to 25% by weight glass fibers and the coating may be from 84% to 96% filler selected from the group consisting of fly ash, charged calcium carbonate, ceramic microspheres and mixtures thereof, and from 16% to 4% acrylic latex binder material.

The adhesive, which is coated on one side of the interply material (hereafter the "interply adhesive"), may be any adhesive which enables the interply material to firmly adhere to a roof deck without nails or other fasteners and which gives the roofing composites of the present invention superior performance in wind, rain and snow as conventionally fastened shingles. In a preferred embodiment, SBS modified asphalt is the adhesive. Additional adhesives include, but are not limited to those adhesives listed below in paragraph 46. Preferably, when an asphaltic adhesive is employed, the softening point of the adhesive is from about 200° F. to 300° F., with a penetration of from about 30° F. to 100° F., and a thermal or compound stability of from about 200° F. to about 300° F. Suitable interply adhesives also include, modified asphalt adhesives containing any one or more of the following: SBS, SBR, SIBS (styrene-isobutylene-styrene), SEBS (styrene-ethylene-butadiene-styrene), tackifying agents, oils, plasticizers and ethylene-vinyl acetate ("EVA"); modified acrylics; low melt EVA's; water based adhesives, organic based adhesives such as rubber cement, foam adhesives, contact cement; caulking such as silicone based, acrylic based and asphalt cement. The modified acrylics may be any self-adhering flexible acrylic that would cure to a non stick finish, have water repellent characteristics, and weathering characteristics equivalent to outdoor paint. One such product has been marketed under the name Polar Seal". The interply may also be adhered to the roof by utilizing double-sided tape.

Alternatively, the interply material may be comprised of a substrate having an ionic charge coated on one side with a coating having essentially the same ionic charge, wherein one side of the interply has a water vapor impermeable coating comprising a material selected from the group consisting of metal foils and preformed plastic films, and wherein the other side of the interply is coated with an interply adhesive. The water vapor impermeable material may be attached to the coated substrate with an adhesive. Examples of such materials are provided in pending U.S. patent application Ser. No. 09/897,308 entitled "Water Vapor Barrier Structural Article" and filed on Jul. 2, 2001, which is incorporated herein by reference in its entirety. In one embodiment, the water vapor impermeable coating has a permeability rating of 0.1 perm and meets the requirements of ASTM E96. In another embodiment, the water vapor impermeable coating has the same permeability specifications as peel and stick underlayment and meets the requirements of ASTM D1970.

Additionally, the interply material may be comprised of a substrate having an ionic charge coated on both sides with a coating having essentially the same ionic charge, wherein one side of the coated substrate is covered with a water vapor impermeable coating comprising a material selected from the group consisting of metal foils and preformed plastic films, and wherein the other side of the coated substrate may be covered with a preformed plastic film water vapor impermeable material. Both water vapor impermeable materials may be attached to the coated substrate with an inter-layer adhesive. Further, both sides of the coated substrate may be coated with the same water vapor impermeable material, either a metal foil or a preformed plastic film, which may be attached to the coated substrate with an inter-layer adhesive. In such embodiments, the coating may be from 84% to 96% filler selected from the group consisting of fly ash, charged calcium carbonate, ceramic microspheres and mixtures thereof and from 16% to 4% acrylic latex binder material. The interply material may include a fine screen mesh slag product, such as Ultrafines or Carbon Black. Whatever the construction of the interply material, one side is additionally coated with an interply adhesive which allows for the fastener-free installation of the interply material on a roof and which imparts to the roofing products, when installed on the roof, equivalent performance in wind, rain and snow as conventionally fastened shingles.

BRIEF DESCRIPTION OF THE DRAWINGS

Exemplary embodiments of the present invention will now be described in detail with reference to the accompanying figures in which:

FIG. 6 is an end view of the assembled components of the nail-less composite hip and ridge roofing product of FIGS. 5A, 5B and 5C; and FIG. 7 is a partial view of a roof ridge showing the manner of installation of the nail-less composite hip and ridge roofing product of FIGS. 5A, 5B and 5C and FIG. 6.

DETAILED DESCRIPTION OF THE INVENTION

Figure 1A:
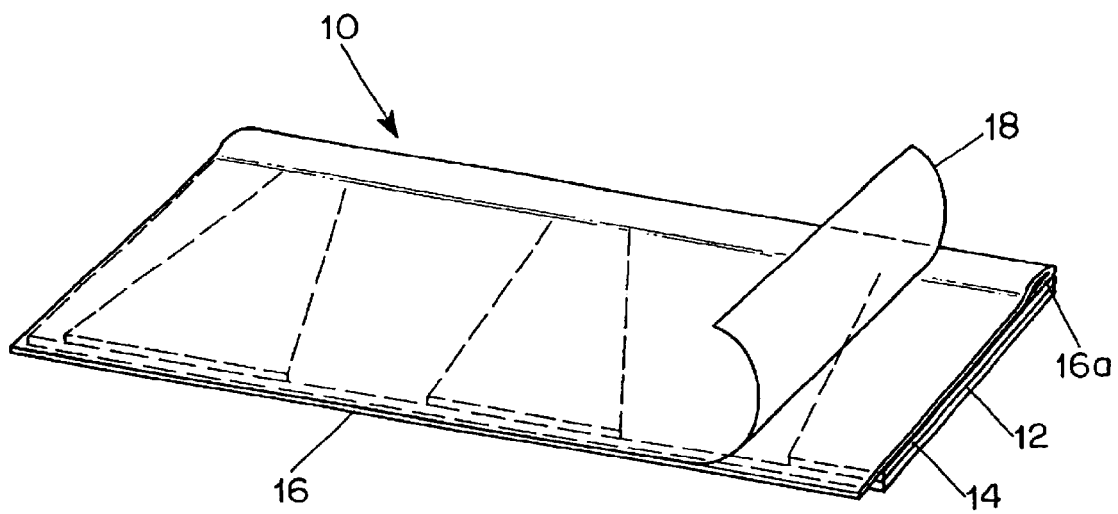
FIGS. 1A, 1B, and 1C are perspective views of an exemplary embodiment of the nail-less composite roofing product in accordance with the invention showing the various stages of preparing the product for installation on a roof deck.
Figure 1B:
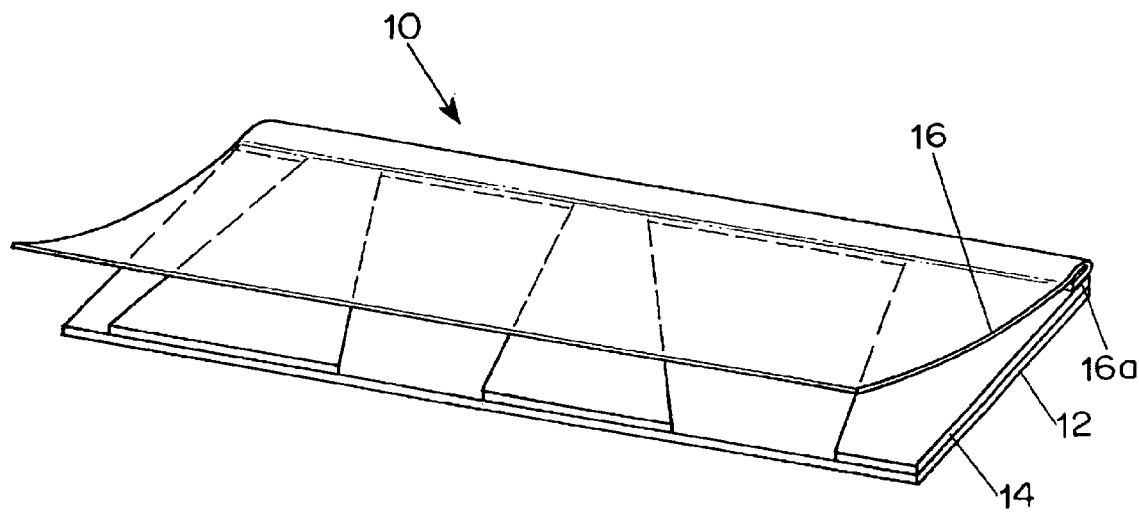
Figure 1C:
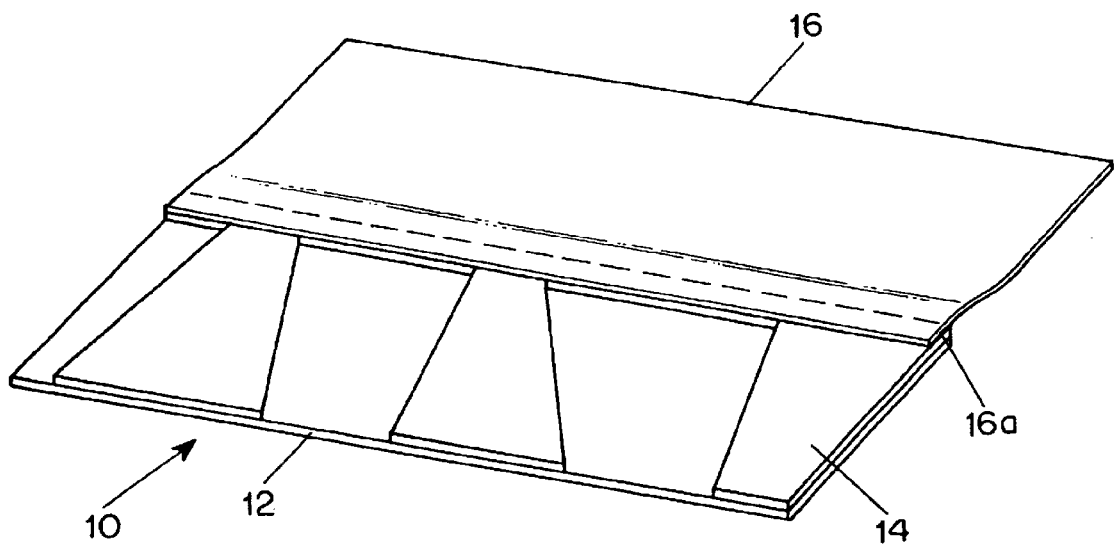

FIGS. 1A, 1B and 1C show the nail-less composite roofing product 10 of the invention incorporating a laminated roofing shingle and illustrate the manner in which the composite shingle product is prepared for installation. As seen from FIG. 2, which shows the end view of the product 10, as assembled for packaging, the exemplary product of the invention comprises backer strip 12, front or dragon teeth layer 14 laminated to the backer strip 12, the strip 12 and layer 14 constituting a laminated shingle, interply layer 16, secured along longitudinal edge 16a of the headlap portion of dragon teeth layer 14 with its outer surface coated with an adhesive, and release film 18 covering the adhesive coated surface of interply layer 16. The interply layer 16 preferably extends somewhat below the bottom edge of the dragon teeth layer 14 of the shingle, as shown.

To ready the product 10 for installation on a roof deck, the release film 18 is removed from the interply layer 16, as shown in FIG. 1A, to expose the adhesive coating. The interply layer 16 is then lifted from the shingle layer, as shown in FIG. 1B, and laid out to be essentially coplanar with the shingle and to fully expose the buttlap portion of the shingle, as seen in FIG. 1C. After the composite roofing product is properly positioned on the roof deck relative to the roof edge or previously installed shingle courses, the interply layer 16, with its adhesive coated side down, is firmly pressed against the roof deck to secure the product in place. The adhesive coated area of the interply layer is of sufficient extent to fix the product on the roof deck without the need for nails or other fasteners and, as will be discussed further below, the interply material serves the added function of an underlayment. A starter strip which may be interply material is used at the eave edge of the roof under the first course to provide weatherproofing between the shingle joints. The starter strip is no less than 2 inches greater than the exposure of the fastener-free shingle being used. The starter strip may be self-adhered or mechanically fastened.

Figure 2:
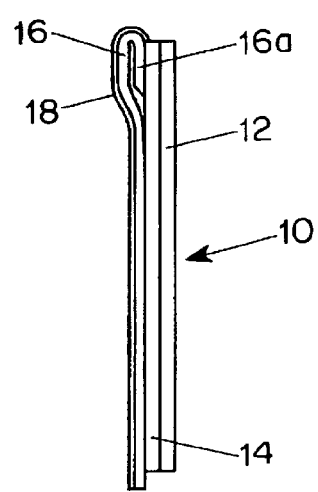
FIG. 2 is an end view of the nail-less composite roofing product of FIGS. 1A, 1B and 1C.
Figure 3A:
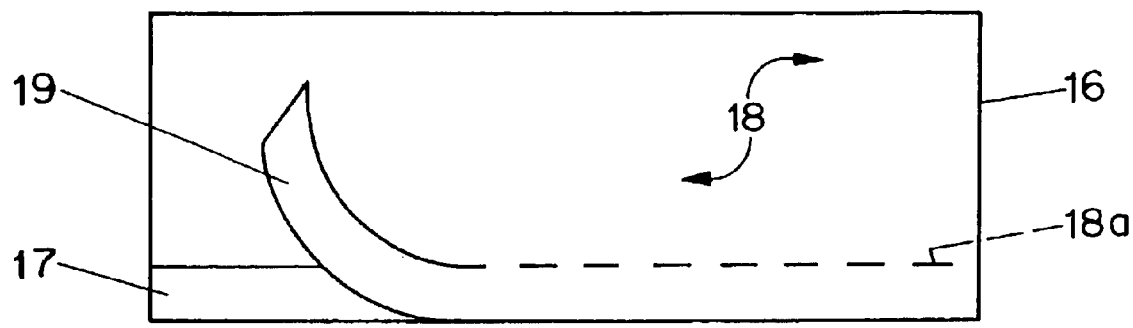
FIGS. 3A, 3B and 3C are plan views of the interply layer and front and back of the shingle layer, respectively, of the nail-less composite roofing product of FIGS. 1A, 1B and 1C and FIG. 2.
Figure 3B:
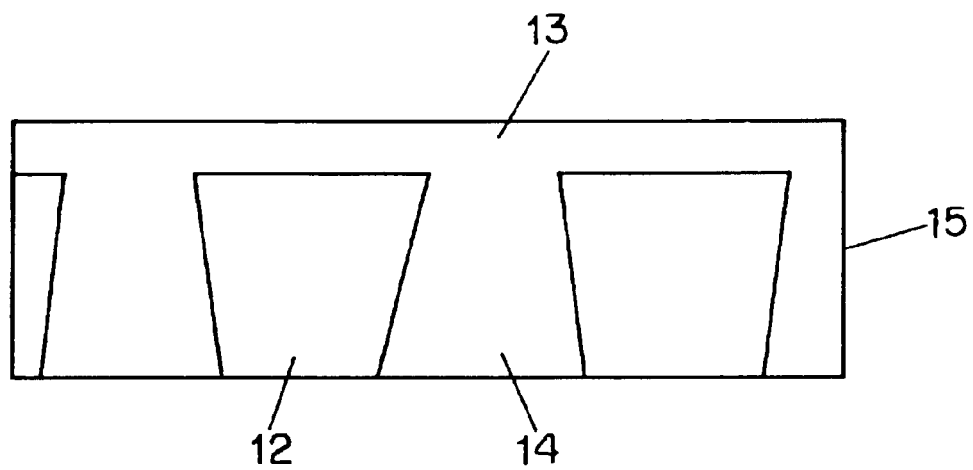
Figure 3C:
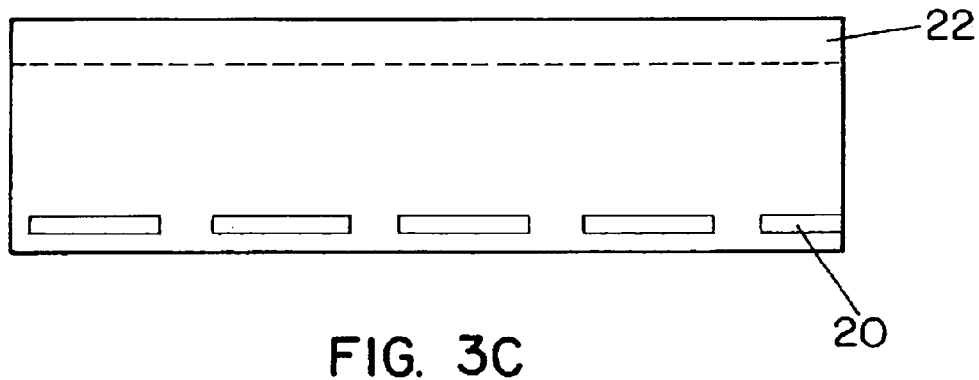

The nail-less composite roofing product of FIGS. 1A, 1B and 1C and of FIG. 2 described above is assembled at manufacture from the several components illustrated in FIGS. 3A, 3B and 3C. FIG. 3A shows the interply layer 16 coated on one side with an interply adhesive 17 which in turn, is covered with a release film 18. The latter is pre-slit along line 18a, to permit a longitudinal strip 19 to be readily removed.

A front view of the laminated shingle component of the product is shown in FIG. 3B. Dragon teeth layer 14 is laminated in known fashion to the backer strip 12 to provide the visible portion of the product as installed on a roof. Either or both layers may be coated with colored granules in various color arrangements to provide aesthetically pleasing roof surfaces, as desired. The upper, continuous portion of the layer 14 comprises the headlap 13 to which the interply layer is adhesively secured, leaving the buttlap 15 exposed.

The reverse side of the shingle component is illustrated in FIG. 3C. As shown, the backside of the backer strip 12 has a series of heat-activated sealant strips 20 adjacent its lower edge, which, as is well known in the shingle art, adhere the shingle to roofing material in the preceding course after installation and exposure to heat of the sun, to resist blow-off in windy conditions.

In one embodiment, the composite roofing product is assembled by removing the release strip 19 from the interply layer, securing the exposed adhesive layer to the headlap 13 of the shingle layer and then folding the interply layer along a score line back over the front of the shingle layer, as seen in FIG. 2. Alternatively, the roofing composite may be assembled by securing the interply layer to the headlap by mechanical means, such as by stapling, sewing, gluing and/or fusing.

If desired, a release tape 22 (FIG. 3C) may also be included along the upper edge of the back side of the headlap 13 which ensures that the sealant strips 20 of one shingle do not adhere to another shingle when packaged. The product is packaged such that the release tape 22 of one product lies on top of the sealant strips 20 of an adjacent product.

Figure 4:
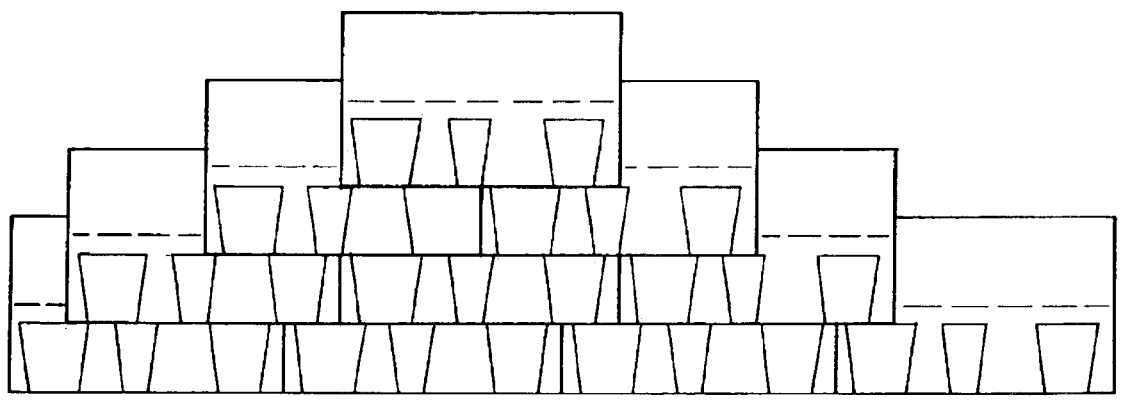
FIG. 4 illustrates, in part, the installation on a roof deck of the nail-less composite roofing product of FIGS. 1A, 1B and 1C and FIG. 2.

FIG. 4 illustrates the manner in which a plurality of roofing products of FIGS. 1A, 1B, 1C and FIG. 2 are applied to a roof deck. As shown, the lower edge of each shingle component is positioned to cover the interply layer 16 of the preceding lower course of products and is horizontally displaced relative to the lower products so that the vertical edges do not align. With each of the interply layers fully extended as shown, it will be seen that the entire roof deck is covered by interply material, avoiding the need for underlayment, and the interply material in turn is covered by one to three shingle layers, providing both a pleasing appearance and a weatherproof protective surface on the roof. The extended interply is preferably no less than 2 inches wider than the shingle exposure to satisfy conventional headlap dimensional requirements.

The composite roofing product of the present invention may alternatively include laminated shingles such as those disclosed in U.S. Pat. No. Des. 369,421. Moreover, the roofing products of the present invention may include three tab asphalt shingles and roll roofing in a manner similar to those described in copending application Ser. No. 10/211, 663. The roofing products comprising these roofing materials are prepared in analogous fashion to the exemplary roofing product shown in FIGS. 1–4 herein.

Figure 5A:
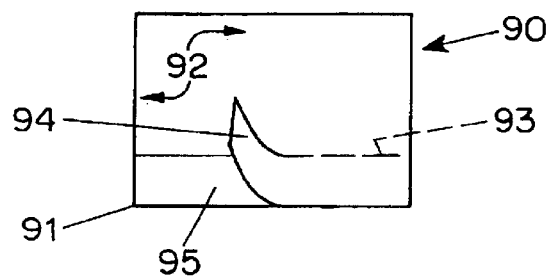
FIGS. 5A, 5B and 5C are plan views of the interply layer and front and back of the shingle layer respectively, of an exemplary embodiment of the invention for use as hip and ridge roofing product.
Figure 5B:
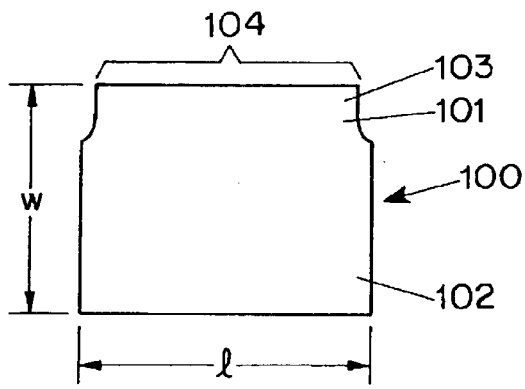
Figure 5C:
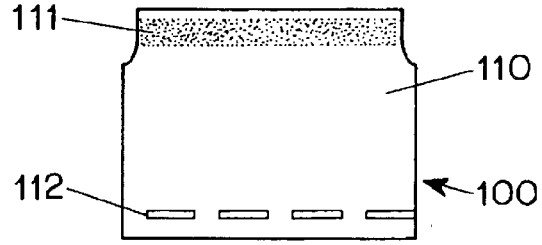

The composite roofing product arrangement described above may also be applied to provide fastener-free composite hip and ridge shingle products. FIGS. 5A, 5B and 5C illustrate the individual components of such products. FIG. 5A shows an interply layer 90, coated with an adhesive 91 which in turn is covered by release film 92. The latter is perforated at 93 to permit a narrow strip 94 to be readily detached.

Shingle component 100 (FIGS. 5B and 5C) is a single layer asphalt shingle preferably covered on one side with colored ceramic granules to resist weather and complement the appearance of roofing product on the sloping portion of the roof deck. Shingle 100 is generally rectangular in shape, with its headlap portion 101 shortened with respect to the length l of the buttlap portion 102 by a pair of symmetrical cutouts 103, to a length 104.

The length of the interply material 90 is equal to the length 104 of the headlap portion of the shingle 100 and is attached to the shingle 100 preferably by adhesively securing the exposed strip 95 to the headlap portion 101. The reverse side of the shingle layer is provided with heat-activated sealant strips 112 to resist blow-off in windy conditions. In addition, the reverse side of the shingle may also be provided with a release tape 111, to aid in the packaging of the roofing products.

An end view of the shingle assembled from the components illustrated in FIGS. 5A, 5B and 5C is shown in FIG. 6. The interply layer 90 is adhesively secured to the front surface of the shingle 100 along the headlap portion 101 thereof and folded over along a fold line at 123 to expose the release film 92. As shown, the interply 90 has a width greater than the width w of shingle 100.

The above-described shingle product is applied onto a roof hip and ridge in a manner similar to the roofing product illustrated in FIGS. 1A, 1B and 1C. The release film 92 is removed and the interply layer 90 folded back, initially to be essentially coplanar with the shingle layer. The shingle product is then positioned at the roof edges to overlap the preceding product along the hip and ridge and pressed down against the opposite roof surfaces to secure it in place. In FIG. 7, two such shingle products are illustrated as applied to a roof ridge. The lowermost product 200 is installed with the bottom edge of its shingle layer 202 even with or extending slightly beyond the roof edge 220 and is secured to the opposite roof surfaces by the adhesive on the interply layer 204 and sealant strips 206. It will be understood that the opposite roof surfaces (not shown) will be laminated shingle products, such as illustrated in FIGS. 1A, 1B, 1C and 2, or other roofing products, installed prior to installation of the ridge product.

The succeeding product 210 overlaps the interply layer of product 200 and extends even with or slightly over the buttlap portion of the shingle portion 202. The headlap portion of each shingle layer is narrower than the buttlap portion and the interply portion is completely covered by the butt portion of the shingle above.

In the exemplary embodiments of the fastener-free composite roofing products summarized above, the interply material may be comprised of a water resistant material, and preferably a water and fire resistant material. The interply material may be comprised of a substrate such as fiberglass, having an ionic charge coated with a coating having essentially the same ionic charge. The coating consists essentially of a filler material and a binder material. The binder material bonds the filler material together and to the substrate. The coating does not bleed through the substrate. Such an interply material is described in U.S. Pat. No. 5,965,257, the entirety of which is incorporated herein by reference, an exemplary embodiment of which is sold by Elk Premium Building Products, Inc. of Dallas, Tex. as VersaShield®. The interply material may be from 10% to 25% by weight glass fibers and the coating may be from 84% to 96% filler selected from the group consisting of fly ash, charged calcium carbonate, ceramic microspheres and mixtures thereof, and from 16% to 4% acrylic latex binder material. The interply material comprises an interply adhesive on the side of the interply material which comes in contact with a roof and which secures the interply material to the roof.

Alternatively, the interply material may be comprised of a substrate having an ionic charge coated on one side with a coating having essentially the same ionic charge, wherein the substrate is covered on the other side with a water vapor impermeable coating comprising a material selected from the group consisting of metal foils and preformed plastic films. The water vapor impermeable material is attached to the coated substrate with an inter-layer adhesive. Elk markets materials including the preformed plastic film as VersaShield® Vapor Seal-I™ and Elk markets materials including the metal foils as VersaShield® ThermoClad-I™. Such materials are described in pending U.S. patent application Ser. No. 09/897,308, the entirety of which is incorporated by reference herein. The compositions of the adhesives employed to attach the water vapor impermeable materials and those applied to the interply material for adhesion to the roof deck may be the same or different.

Additionally, the interply material may be comprised of a substrate having an ionic charge coated on both sides with a coating having essentially the same ionic charge. The coating again consists essentially of a filler material and a binder material and the binder material bonds the filler material together and to the substrate. The coating does not bleed through the substrate. One side of the coated substrate is covered with a water vapor impermeable coating comprising a material selected from the group consisting of metal foils and preformed plastic films. The water vapor impermeable material is attached to the coated substrate with an adhesive.

Alternatively, one side of the coated substrate may be covered with a metal foil water vapor barrier material and the other side of the coated substrate may be covered with a preformed plastic film water vapor impermeable material. Both water vapor impermeable materials may be attached to the coated substrate with an adhesive.

Further, both sides of the coated substrate may be coated with either a metal foil water vapor impermeable material or a preformed plastic film water vapor impermeable material which may be attached to the coated substrate with an adhesive.

In such embodiments, the coating may be from 84% to 96% filler selected from the group consisting of fly ash, charged calcium carbonate, ceramic microspheres and mixtures thereof and from 16% to 4% acrylic latex binder material. Alternatively, a waterproof coating may be used instead of the impermeable films listed above.

The adhesive for adhering the water vapor impermeable materials in the embodiments described above (hereafter the "inter-layer adhesive") is selected from the group consisting essentially of low density polyethylene, high density polyethylene, polyethylene-vinyl acetate, polypropylene, polyvinylidene chloride, nylon, polyester and mixtures thereof. Alternatively, an asphaltic adhesive, such as an asphaltic adhesive similar to standard laminating adhesives, may be used.

As further discussed below in Example 1, the interply material may include a fine screen mesh slag product, such as RG 4276 Ultra Fine (Reed Minerals Division, Harsco Corporation, Memphis Tenn.), LifeTech® Ultrafines (FMC, Philadelphia, Pa.), and Carbon Black (available from Cabot Corp., Billerica, Mass. and Alexandria Carbon Black Co., Alexandria, Egypt). In a preferred embodiment, the fine screen mesh slag product is RG 4276 Ultra Fine (Reed Minerals Division, Harsco Corporation, Memphis Tenn.).

In the roofing material of the present invention, alternative interply materials may also be employed. One such material is comprised of a roll roofing product including a fiberglass substrate coated with asphaltic material and mineral surfacing materials. Such interply materials include Ridglass TG-2 sold by Ridglass Shingle Manufacturing Co. of Fresno, Calif.; OCF Roll Roofing sold by Owens Corning of Toledo, Ohio and Z-Base sold by Black Warrior Roofing, Inc. of Tuscaloosa, Ala. Another such interply material is comprised of asphalt impregnated felt underlayment material, an example of which is sold as Fontana Vulca-Seal 40 by Fontana Paper of Fontana, Calif. A nonasphaltic barrier product is available from Vliepa of Bracht, Germany. Materials that satisfy the requirements of ASTM D226 Type I or II, ASTM 04601 Type I or II, ICBO AC165 products, ICBO AC160 products, ASTM 4869 Type I, II, III or IV ASTM D2626, ASTM D3909, D2178, D249, D224, D371, D1970, D 6757 and products useful in the plastic sheathing industry which may not meet published ASTM standards may also be suitable interply materials. Suitable interply materials which satisfy the requirements of ASTM D 1970-01 include JM Sure Grip and JM Nord Shield, available from Johns Manville, and GAF Weatherwatch, available from GAF. In accordance with the present invention, these interply materials further include an interply adhesive on one side.

The interply materials described above enhance the roofing materials' impact resistance characteristics, particularly resistance to damage caused by hail stones. To further improve such characterstics, the interply material may include polyester fibers in the coated substrates. A preferred substrate would be comprised of 85% by wt. glass fibers and 15% by wt. polyester fibers. Other suitable substrate materials are disclosed in U.S. Pat. No. 6,341,462 B2, the entirety of which is incorporated by reference. Example of such materials include woodpulp, cotton fibers, wool fibers, carpet material, nylon fibers, rayon fibers, acrylic fibers, polyolefin fibers, polypropylene fibers, recycled plastics fibers and mixtures thereof.

A roll roofing product including an organic, e.g. felt, or an inorganic substrate such as fiberglass or mineral wool may also be employed for the interply material. The substrate may be coated with asphaltic material on which mineral surfacing materials, such as granules, sand, and slag are then applied and may have an interply adhesive, such as SBS modified asphalt, on the other side. Another such interply material is comprised of asphalt impregnated felt underlayment material, wherein one side of the interply has an interply adhesive, such as SBS modified asphalt. Other examples of suitable underlayments include known self-adhesive peel and stick underlayments which are available from Malarkey (Pleasanton, Calif.; Right Start™ and Arctic Seal™ Peel & Stick), Polyglass USA (Hazleton, Pa.; Polystick™ IR-X, Polystick™ P, Polystick™ TU and Polystick™ MU) WR Grace (Columbia, Md.; Ice & Water Shield™), Georgia-Pacific (Atlanta, Ga.; Tough-Guard™), Tainko (Joplin, Md.; TW Metal & Tile Underlayment, TW-60, TW Flash-n-Wrap™, TW Moisture Wrap™, TW Moisture Guard, and Bridgeguard™), GAF (Wayne, N.J.; WeatherWatch®, StormGuard®, MetalMate™), and Certainteed (Valley Forge, Pa.; Black Diamond™ base sheet).

As shown in FIGS. 1–4, the interply material is of a width slightly greater than the width of the roofing shingle. Thus, in a preferred embodiment, the dragon teeth layer has a width of 10.25 inches, including a 2 inch headlap, and the interply layer is 10.75 inches. This relationship ensures that the entire roof deck is covered by an interply material when the composite roofing product is installed.

An added advantage of the arrangement of the present invention is that it permits large exposure shingles, i.e., shingles having a buttlap section greater than 7 inches, without retooling existing machinery, since the interply layer provides the fire resistance and weather resistance ordinarily supplied by shingle headlaps.

In the case of the hip and ridge roofing products of FIGS. 5A, 5B, 5C, 6 and 7, the interply material is of greater width than the shingle layer, but it may be of any width depending on particular installation requirements.

The interply material is preferably attached to the roofing shingle with interply adhesive but may also be attached by other suitable means, for instance, by mechanical means such as stapling or sewing or by fusing or gluing.

The interply adhesive may be applied to one side of the interply material by any means known in the art. For example, the interply adhesive may be applied to the interply with a conventional shingle machine coater, a curtain coater or an extruder. In a preferred embodiment, the thickness of the interply adhesive is from about 0.020 to 0.045 inches.

Since the interply material can effectively replace the large headlap section of a conventional shingle, which was typically believed to be needed for effective protection from the elements, the interply material can be made of any weather proofing material known in the art. Preferably, the interply material is made of material that is both fire and water resistant with an interply adhesive applied on the side of the interply material which contacts the roof.

The interply material preferably has water shedding or waterproof characteristics. The adhesive on the back of the interply may be activated by contact or by removing a release film and should adhere to any surface for the life of the product. The interply should be permanently attached to the shingle portion that is exposed to the weather. The shingle itself should have the traditional sealant application to seal the leading edge of the shingle down and prevent blow offs once applied on the roof. The self-adhering interply should be sized to overlap the roof deck width of the next course of shingles' exposure plus common bond (nailing area for strip shingles) width by at least one half inch to ensure that the entire deck is covered by the self-adhering interply if it is intended to replace the roof underlayment.

The preferred interply material is Prestique Grande Interply, one of Elk's VersaShield coated substrates. Typical properties are listed below:

| | |
|---|---|
| Basis Weight (l/b 100 ft²) | 17.0 |
| (g/m²) | 830 |
| Thickness (mil) | 43 |
| (mm) | 1.09 |
| Frazier Porosity (cfm/ft²) | 2.4 |
| Tensile Strength MD | 56 |
| (lb/1" width) CD | 36 |
| Elmendorf Tear MD | 490 |
| (gram) CD | 586 |
| ASTM Nail Pull (lbf) | 11.1 |
| Water Wicking Height (inch) | 0 |

Although the present invention has been described with reference to certain preferred embodiments, various modifications, alterations, and substitutions will be apparent to those skilled in the art without departing from the spirit and scope of the invention, as defined by the appended claims.

We claim:

1. A composite roofing product comprising:
   a roofing material;
   an interply material attached to said roofing material along an edge thereof to permit a major portion of the interply material to be folded away from said roofing material for application to a roof deck; and
   an adhesive coating on one side of said interply material, whereby said adhesive is effective to secure said roofing product to the roof deck.

2. The composite roofing product according to claim 1, wherein the roofing material is selected from the group consisting of roofing shingles and roll roofing.

3. The composite roofing product according to claim 2, wherein said roofing material is a multiple layer roofing shingle.

4. The composite roofing product according to claim 3 wherein said shingle is a laminated shingle.

5. The composite roofing product according to claim 2, wherein said roofing material is a single layer shingle.

6. The composite roofing product according to claim 5 wherein said shingle is a three tab shingle.

7. The composite roofing product according to claim 2, wherein the roofing material is a hip and ridge shingle.

8. The composite roofing product according to claim 1, wherein the interply material comprises a water resistant material.

9. The composite roofing product according to claim 8, wherein the interply material is a roll roofing product comprising a fiberglass substrate coated with asphaltic material and mineral surfacing materials.

10. The composite roofing product according to claim 8, wherein the interply material comprises of asphalt impregnated felt underlayment material.

11. The composite roofing product according to claim 1, wherein the interply material comprises a substrate having an ionic charge coated with a coating having essentially the same ionic charge wherein said coating consists essentially of a filler material and a binder material and wherein said binder material bonds the filler material together and to the substrate and wherein said coating does not bleed through said substrate.

12. The composite roofing product according to claim 11, wherein the interply material is from 10% to 25% by weight glass fibers and said coating is from 84% to 96% filler selected from the group consisting of fly ash, charged calcium carbonate, ceramic microspheres and mixtures thereof, and from 16% to 4% acrylic latex binder material.

13. The composite roofing product according to claim 1, wherein the interply material comprises a substrate having an ionic charge,
(a) coated on one side with a coating having essentially the same ionic charge wherein said coating consists essentially of a filler material and a binder material and wherein said binder material bonds the filler material together and to the substrate and wherein said coating does not bleed through said substrate; and
(b) covered on the other side with a water vapor impermeable coating comprising a material selected from the group consisting of metal foils and preformed plastic films;
wherein said water vapor impermeable material is attached to said coated substrate with an adhesive.

14. The composite roofing product according to claim 13, wherein one side of said coated substrate is covered with a metal foil water vapor barrier material and the other side of said coated substrate is covered with a preformed plastic film water vapor impermeable material; and wherein both water vapor impermeable materials are attached to said coated substrate with an adhesive.

15. The composite roofing product according to claim 13, wherein both sides of the coated substrate are coated with a metal foil water vapor impermeable material and wherein said water vapor impermeable material is attached to said coated substrate with an adhesive.

16. The composite roofing product according to claim 13, wherein both sides of the coated substrate are coated with a preformed plastic film water vapor impermeable material and wherein said water vapor impermeable material is attached to said coated substrate with an adhesive.

17. The composite roofing product according to claim 16, wherein said coating is from 84% to 96% filler selected from the group consisting of fly ash, charged calcium carbonate, ceramic microspheres and mixtures thereof and from 16% to 4% acrylic latex binder material.

18. The composite roofing product according to claim 13, wherein one side of said coated substrate is covered with a water vapor impermeable coating comprising a material selected from the group consisting of metal foils and preformed plastic films and wherein said water vapor impermeable material is attached to said coated substrate with an adhesive.

19. The composite roofing product according to claim 1, wherein the interply material comprises a substrate having an ionic charge coated on both sides with a coating having essentially the same ionic charge wherein said coating consists essentially of a filler material and a binder material and wherein said binder material bonds the filler material together and to the substrate and wherein said coating does not bleed through said substrate.

20. The composite roofing product according to claim 19, wherein one side of said coated substrate is covered with a waterproof coating.

21. The composite roofing product according to claims, 17, 19, 18, 14, 15 or 16 wherein the adhesive attaching the material to the substrate is selected from the group consisting of low density polyethylene, high density polyethylene, polyethylene-vinyl acetate, polypropylene, polyvinylidene chloride, nylon, polyester, asphaltic adhesives and mixtures thereof.

22. The composite roofing product according to claim 1 wherein the interply material comprises a substrate that includes glass fibers and polyesters fibers.

23. The composite roofing product according to claim 1, wherein the interply material is attached to said roofing material with an adhesive selected from the group consisting of asphalt, contact cement, glue, plastic, low density polyethylene, high density polyethylene, polyethylene-vinyl acetate, polypropylene, polyvinylidene chloride, nylon, polyester and mixtures thereof.

24. The composite roofing product according to claim 1, further comprising a release material which covers the adhesive.

25. The composite roofing product of claim 1, wherein the adhesive is SBS modified asphalt.

26. The composite roofing product of claim 1 wherein said roofing material is shortened at said edge and said interply material is of the same length as the shortened edge of said roofing material.

27. The composite roofing product of claim 1 wherein the roofing material is a roofing shingle having a buttlap portion and a headlap portion.

28. The composite roofing product according to claim 27 wherein said headlap portion is equal in length to said buttlap portion and substantially narrower than said buttlap portion.

29. The composite roofing product according to claim 27 wherein said headlap portion is shorter than said buttlap portion and said interply material is equal in length to said headlap portion, thereby overlapping less than all of said buttlap portion.

* * * * *

UNITED STATES PATENT AND TRADEMARK OFFICE
CERTIFICATE OF CORRECTION

PATENT NO. : 6,936,329 B2
DATED : August 30, 2005
INVENTOR(S) : Matti Kiik et al.

It is certified that error appears in the above-identified patent and that said Letters Patent is hereby corrected as shown below:

Column 3,
Line 31, "MU)" should read -- MU), --.

Column 5,
Line 24, "non stick" should read -- non-stick --.
Line 27, "Polar Seal"." should read -- Polar Seal. --.
Line 46, "peel and stick" should read -- peel-and-stick --.

Column 10,
Line 53, "Example" should read -- Examples --.

Column 11,
Line 7, "MU)" should read -- MU), --.
Line 9, "Tainko" should read -- Tamko --.

Column 12,
Line 39, "claim 3" should read -- claim 3, --.
Line 43, "claim 5" should read -- claim 5, --.
Line 55, "of" should be deleted.

Column 14,
Line 10, "claims," should read -- claims --.
Line 11, "17, 19, 18, 14, 15 or 16" should read -- 13, 14, 15, 16, 17 18 or 19, --.
Lines 17 and 32, "claim 1" should read -- claim 1, --.
Line 19, "polyesters" should read -- polyester --.
Line 36, "claim 1" should read -- claim 1, --; and "the" should read -- said --.

UNITED STATES PATENT AND TRADEMARK OFFICE
CERTIFICATE OF CORRECTION

PATENT NO. : 6,936,329 B2
DATED : August 30, 2005
INVENTOR(S) : Matti Kiik et al.

It is certified that error appears in the above-identified patent and that said Letters Patent is hereby corrected as shown below:

Column 14 (cont'd),
Lines 39 and 43, "claim 27" should read -- claim 27, --.

Signed and Sealed this

Twenty-eighth Day of February, 2006

JON W. DUDAS
*Director of the United States Patent and Trademark Office*